United States Patent
Soga

(10) Patent No.: US 12,463,399 B2
(45) Date of Patent: Nov. 4, 2025

(54) LIGHT-EMITTING DEVICE AND DRIVING DEVICE

(71) Applicant: OLYMPUS CORPORATION, Hachioji (JP)

(72) Inventor: Takumi Soga, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 910 days.

(21) Appl. No.: 17/678,293

(22) Filed: Feb. 23, 2022

(65) Prior Publication Data

US 2022/0181844 A1 Jun. 9, 2022

Related U.S. Application Data

(63) Continuation of application No. PCT/JP2020/001497, filed on Jan. 17, 2020.

(51) Int. Cl.
*H01S 5/062* (2006.01)
*H01S 5/06* (2006.01)
(Continued)

(52) U.S. Cl.
CPC ...... *H01S 5/06223* (2013.01); *H01S 5/06216* (2013.01); *H01S 5/06808* (2013.01);
(Continued)

(58) Field of Classification Search
CPC .............. H01S 5/0428; H01S 5/06216; H01S 5/06808; H01S 5/06223; H01S 5/0617
See application file for complete search history.

(56) References Cited

U.S. PATENT DOCUMENTS

| | | | |
|---|---|---|---|
| 4,835,780 A * | 5/1989 | Sugimura | H01S 5/06216 372/29.01 |
| 2009/0219964 A1* | 9/2009 | Yossi | H01S 5/042 372/38.02 |

(Continued)

FOREIGN PATENT DOCUMENTS

| | | |
|---|---|---|
| JP | 62-118590 A | 5/1987 |
| JP | 2005-63997 A | 3/2005 |

(Continued)

OTHER PUBLICATIONS

International Search Report dated Mar. 24, 2020, issued in counterpart International Application No. PCT/ JP2020/001497, w/English translation (5 pages).
(Continued)

*Primary Examiner* — Sean P Hagan
(74) *Attorney, Agent, or Firm* — WHDA, LLP

(57) ABSTRACT

In a light-emitting device according to a first aspect of the present invention, a condenser is configured to smooth an output voltage of a switching power source. A voltage source of the light-emitting device is configured to adjust a voltage of the condenser. A processor of the light-emitting device is configured to turn on a light-emitting element of the light-emitting device. The processor is configured to measure the output voltage in a turning-on period of the light-emitting element and store the measured output voltage on the storage medium as a reference voltage. The processor is configured to turn off the light emitting element. The processor is configured to control a voltage output from the voltage source on the basis of the reference voltage stored on the storage medium so as to adjust the voltage of the condenser immediately before the light-emitting element is next turned on.

1 Claim, 4 Drawing Sheets

(51) Int. Cl.
  H01S 5/068 (2006.01)
  H02M 1/08 (2006.01)
  H02M 3/157 (2006.01)
  H02M 3/158 (2006.01)

(52) U.S. Cl.
  CPC ............ *H02M 1/08* (2013.01); *H02M 3/157* (2013.01); *H02M 3/158* (2013.01); *H01S 5/0617* (2013.01)

(56) References Cited

U.S. PATENT DOCUMENTS

| | | |
|---|---|---|
| 2009/0237127 A1 | 9/2009 | Noguchi et al. |
| 2011/0085576 A1* | 4/2011 | Crawford ............... H05B 45/38 372/38.07 |
| 2014/0077714 A1 | 3/2014 | Suzuki |
| 2014/0139605 A1 | 5/2014 | Fujita et al. |
| 2014/0347708 A1 | 11/2014 | Omori et al. |
| 2018/0020515 A1 | 1/2018 | Rutgers |
| 2018/0183208 A1 | 6/2018 | Nerheim |
| 2018/0359829 A1 | 12/2018 | Fujita |

FOREIGN PATENT DOCUMENTS

| | | |
|---|---|---|
| JP | 2009-231330 A | 10/2009 |
| JP | 2012-080019 A | 4/2012 |
| JP | 2014-003143 A | 1/2014 |
| JP | 2014-063590 A | 4/2014 |
| JP | 2014-78679 A | 5/2014 |
| JP | 2014-103319 A | 6/2014 |
| JP | 2014-229691 A | 12/2014 |
| JP | 2014-230296 A | 12/2014 |
| JP | 5660936 B2 | 1/2015 |
| JP | 2017-004735 A | 1/2017 |
| JP | 2017-005793 A | 1/2017 |
| JP | 2017-021938 A | 1/2017 |
| JP | 2018-41938 A | 3/2018 |
| JP | 2018-510469 A | 4/2018 |
| JP | 2018-202811 A | 12/2018 |

OTHER PUBLICATIONS

Office Action dated May 30, 2023, issued in counterpart JP Application No. 2021-570600, with English Translation. (5 pages).

* cited by examiner

LIGHT-EMITTING DEVICE AND DRIVING DEVICE

BACKGROUND OF THE INVENTION

Field of the Invention

The present invention relates to a light-emitting device and a driving device.

The present application is a continuation application based on International Patent Application No. PCT/JP2020/001497 filed on Jan. 17, 2020, the content of which is incorporated herein by reference.

Description of Related Art

As a driving circuit that drives a light-emitting element such as a laser diode (LD), a combination of a constant-voltage power source and a constant-current driver is widely used.

On the other hand, a combination of a constant-voltage power source and an FET switch that turns on and off a current supplied to a light-emitting element is known as a driving circuit of which power consumption is saved. Such a driving circuit is disclosed in Japanese Patent No. 5660936 and Japanese Unexamined Patent Application, First Publication No. 2005-063997.

SUMMARY OF THE INVENTION

According to a first aspect of the present invention, a light-emitting device is configured to regularly or irregularly repeat a turning-on operation and a turning-off operation. The light-emitting device includes a light-emitting element, a processor, a switching power source of a current-output-controlled type, a condenser, a switch, and a voltage source. The light-emitting element is driven by using a pulse. The processor includes a storage medium. The switching power source is configured to control current-output thereof on the basis of a current value designation signal output from the processor. The condenser is configured to smooth an output voltage of the switching power source. The switch is configured to turn on and off a current input into the light-emitting element on the basis of a turning-on designation signal output from the processor. The voltage source is configured to adjust a voltage of the condenser. The processor is configured to turn on the current value designation signal and the turning-on designation signal at the same time so as to turn on the light-emitting element. The processor is configured to measure the output voltage in a turning-on period of the light-emitting element. The processor is configured to store the measured output voltage on the storage medium as a reference voltage. The processor is configured to turn off the current value designation signal and the turning-on designation signal at the same time so as to turn off the light-emitting element. The processor is configured to control a voltage output from the voltage source on the basis of the reference voltage stored on the storage medium so as to adjust the voltage of the condenser immediately before the light-emitting element is next turned on.

According to a second aspect of the present invention, in the first aspect, the processor may be configured to cause the voltage source to output a lower voltage than the reference voltage stored on the storage medium in a turning-off period of the light-emitting element.

According to a third aspect of the present invention, in the second aspect, the lower voltage than the reference voltage may be set in accordance with a length of the turning-off period.

According to a fourth aspect of the present invention, a driving device is configured to drive a light-emitting device configured to regularly or irregularly repeat a turning-on operation and a turning-off operation. The driving device includes a processor, an analog switch, a voltage source, and a digital switch. The light-emitting device includes a light-emitting element, the processor, a switching power source of a current-output-controlled type, a condenser, a switch, and the voltage source. The light-emitting element is driven by using a pulse. The switching power source is configured to control current-output thereof on the basis of a current value designation signal output from the processor. The condenser is configured to smooth an output voltage of the switching power source. The switch is configured to turn on and off a current input into the light-emitting element on the basis of a turning-on designation signal output from the processor. The voltage source is configured to adjust a voltage of the condenser. The processor includes a first digital-to-analog comparator, a first PWM circuit, an analog-to-digital comparator, a storage medium, a second PWM circuit, and a second digital-to-analog comparator. The first digital-to-analog comparator is configured to output an analog signal so as to set the current value designation signal corresponding to a value of a current that flows in the light-emitting element when the current is in an ON state. The first PWM circuit is configured to output a first PWM signal corresponding to the turning-on designation signal to the switch and turn on and off the current that flows in the light-emitting element. The analog-to-digital comparator is configured to measure the output voltage. The storage medium is configured to store thereon the measured output voltage as a reference voltage. The second PWM circuit is configured to output, as an amplifier-output signal to the digital switch, a second PWM signal that has the same cycle as that of the first PWM signal and is in synchronization with the first PWM signal. The second digital-to-analog comparator is configured to output the reference voltage stored on the storage medium to the voltage source. The analog switch is configured to cause the current value designation signal to coordinate with the turning-on designation signal. The voltage source is an operational amplifier configured to compare the reference voltage input into a positive input terminal thereof with the output voltage input into a negative input terminal thereof and output a current such that the reference voltage and the output voltage are the same. The digital switch is configured to connect an output terminal of the operational amplifier to an output terminal of the switching power source when the amplifier-output signal input into the digital switch is at a high level. The first PWM circuit is configured to turn on the turning-on designation signal. The analog switch is configured to turn on the current value designation signal at the same time as the turning-on designation signal is turned on so as to turn on the light-emitting element. The current value designation signal corresponds to a value of the current that is controlled in accordance with the analog signal and flows in the light-emitting element when the current is in the ON state. The analog-to-digital comparator is configured to measure the output voltage in a turning-on period of the light-emitting element and store the measured output voltage on the storage medium as a reference voltage. The first PWM circuit is configured to turn off the turning-on designation signal. The analog switch is configured to turn off the current value designation signal at the same time as the turning-on designation signal is turned off so as to turn off the light-emitting element. The voltage source is configured to compare the reference voltage input into the positive input terminal with the output voltage input into the negative input terminal and output a current to the condenser so as to adjust the voltage of the condenser such that the reference voltage and the output voltage are the same in a period during which the second PWM circuit turns on the digital switch by outputting the amplifier-output signal at the high level immediately before the light-emitting element is next turned on.

DETAILED DESCRIPTION OF THE INVENTION

First Embodiment

Figure 1:
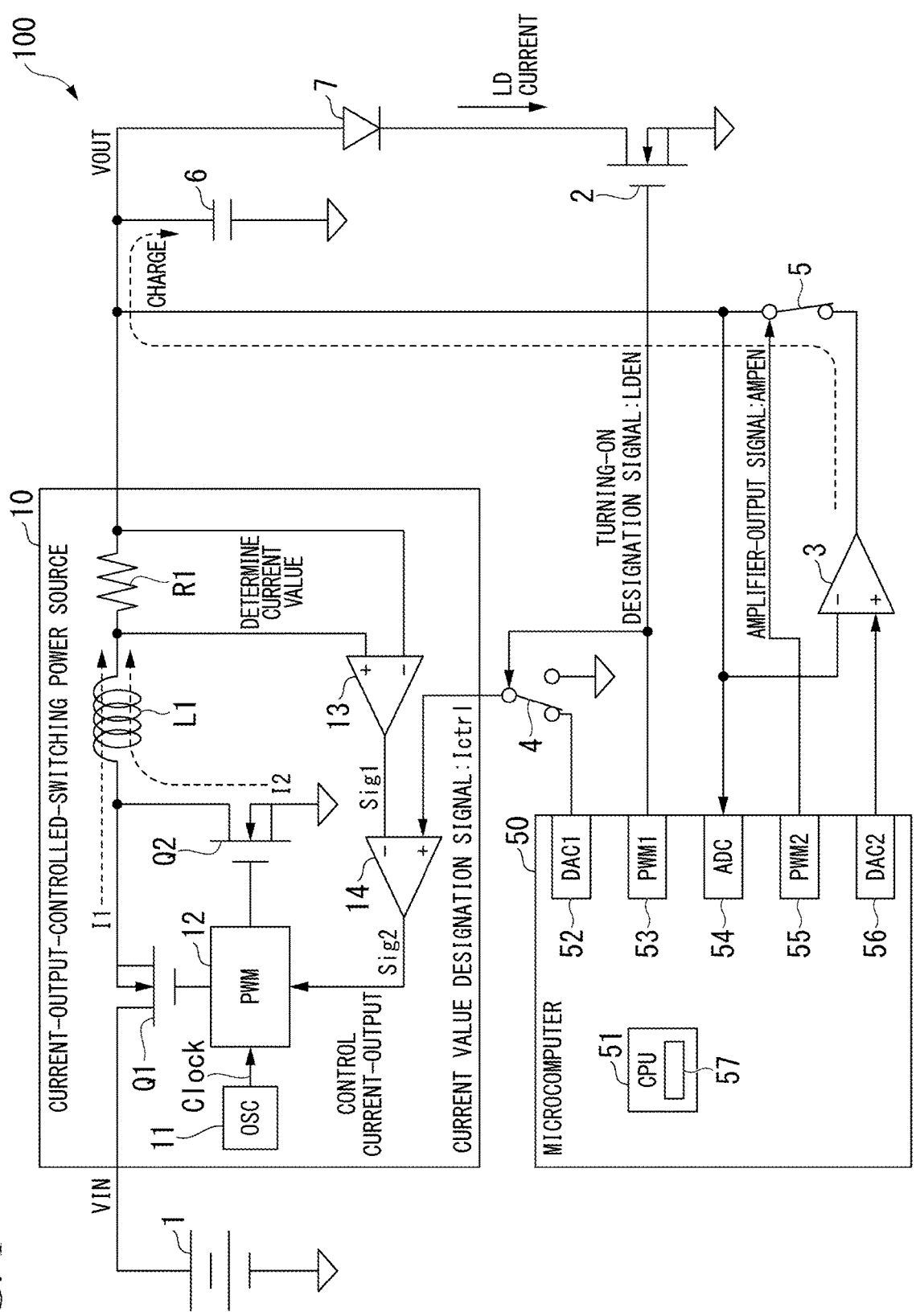
FIG. 1 is a block diagram showing an example of a configuration of a light-emitting device according to a first embodiment of the present invention.

Hereinafter, a first embodiment of the present invention will be described with reference to the drawings. FIG. 1 is a block diagram showing an example of a configuration of a light-emitting device according to the first embodiment of the present invention.

A light-emitting device 100 shown in FIG. 1 includes a current-output-controlled-switching power source 10, which is a switching power source of a current-output-controlled type, an FET switch 2 (switch), an operational amplifier 3 (voltage source), an analog switch 4 (analog switch), a microcomputer 50 (processor), a digital switch 5 (digital switch), an output condenser 6 (condenser), and a light-emitting element 7.

The current-output-controlled-switching power source 10 controls current-output thereof on the basis of a current value designation signal output from the microcomputer 50.

Here, a configuration of the current-output-controlled-switching power source 10 will be more specifically described.

The current-output-controlled-switching power source 10 is an example of a typical stepping-down synchronization rectification circuit. In other words, the current-output-controlled-switching power source 10 is configured to input a direct-current (DC) voltage accumulated in a battery 1 as an input voltage VIN, step down the input voltage VIN to an output voltage VOUT, and output the output voltage VOUT.

To that end, the current-output-controlled-switching power source 10 includes an oscillator (OSC) 11, a PWM signal generation circuit 12, an amplifier 13, an amplifier 14, a transistor Q1, a transistor Q2, an inductor L1, and a resistor R1.

The PWM signal generation circuit 12 repeats an operation of turning on the transistor Q1 and the transistor Q2 in turn in accordance with a signal Clock output from the OSC 11.

When the transistor Q1 is turned on, in other words, the transistor Q2 is turned off, a current I1 flows in a direction from an input terminal of the current-output-controlled-switching power source 10 to an output terminal of the current-output-controlled-switching power source 10. The input voltage VIN is input into the input terminal, and the output voltage VOUT is output from the output terminal. Next, the transistor Q2 is turned on, in other words, the transistor Q1 is turned off. The current of the inductor L1 continues to flow due to the function of the inductor, and a current I2 flows to the output terminal of the current-output-controlled-switching power source 10. It is possible to control the amount of output in accordance with duty that is the proportion of a turning-on period of the transistor Q1 to a turning-on period of the transistor Q2.

The resistor R1 is used for detecting a current. A voltage proportional to a current flowing in the resistor R1 is generated across the resistor R1 in accordance with Ohm's law. The voltage (difference voltage) across the resistor R1 is input into the amplifier 13. The amplifier 13 converts the difference voltage into a voltage having a value applicable to an operation range of the amplifier 14 and outputs the voltage as a voltage signal Sig1.

The amplifier 14 compares a current value designation signal Ictrl and the voltage signal Sig1, which are voltage signals, with each other and outputs a signal Sig2 indicating the difference between the voltage signals.

Here, the current value designation signal Ictrl indicates a voltage signal that is based on a pulse current (intended current) that flows in the LD. The voltage signal Sig1 indicates a voltage value that is based on a present current value, as described above. In other words, it is possible to determine whether the voltage output front the power source is to be increased or reduced in order to cause an intended current to flow in the LD by determining the difference between the current value designation signal Ictrl and the voltage signal Sig1. The signal Sig2 indicates a result of the determination.

The signal Sig2 is input into the PWM signal generation circuit 12. The PWM signal generation circuit 12 changes the proportion of the turning on period of the transistor Q1 to the turning-on period of the transistor Q2 on the basis of the voltage value of the signal Sig2, thus changing the amount of the voltage output from the power source.

In other words, the amplifier 14 compares the voltage signal Sig1 corresponding to the present current value acquired in the resistor R1 and the amplifier 13 with the intended current value designation signal Ictrl. When the present current value is less than an intended value, the PWM signal generation circuit 12 increases the duty of the transistor Q1 and the transistor Q2, thus increasing the amount of the voltage output from the power source.

On the other hand, when the present current value is greater than the intended value, the PWM signal generation circuit 12 reduces the duty of the transistor Q1 and the transistor Q2, thus reducing the amount of the voltage output from the power source.

The value of the current output via the resistor R1 by repeating the above-described operations is similar to the current value that is based on the current value designation signal Ictrl. In a case in which the current value designation signal Ictrl is a pulse voltage, a pulse current proportional to the voltage flows at the output terminal of the current-output-controlled-switchiog power source 10.

However, a delay, namely dullness of a pulse is generated in an LD current, which flows in the light-emitting element 7, due to the capacity of the output condenser 6 (smoothing condenser) as the current value designation signal Ictrl changes.

Next, each component of the light-emitting device 100 will be described in detail.

The output condenser 6 (condenser) smooths the voltage output from the current-output-controlled-switching power source 10.

The light-emitting element 7 is a laser diode (LD) element and emits light when the light-emitting element 7 is driven by using a pulse or supplying an LD current from the current-output-controlled-switching power source 10. The light-emitting element 7 emits light when the light-emitting element 7 is turned on in a turning-on period. The light-emitting element 7 stops emitting light when the light-emitting element 7 is turned off in a turning-off period.

As described above, the current-output-controlled-switching power source 10 outputs a current proportional to the voltage of the current value designation signal Ictrl. In other words, the current-output-controlled-switching power source 10 controls current-output thereof on the basis of the current value designation signal Ictrl output from the microcomputer 50.

The FET switch 2 (switch) turns on and off a current input into the LD on the basis of a turning-on designation signal LDEN. In other words, the FET switch 2 turns on and off the LD current input into the light-emitting element 7 on the basis of the turning-on designation signal output from the microcomputer 50.

The microcomputer 50 (processor) outputs the current value designation signal Ictrl and the turning-on designation signal LDEN as described above. A configuration for this purpose will be described by referring to FIG. 1.

The microcomputer 50 (processor) includes a CPU 51, a first digital-to-analog comparator 52, a first PWM circuit 53, an analog-to-digital comparator 54, a second PWM circuit 55, and a second digital-to-analog comparator 56. The first digital-to-analog comparator 52 (first digital-to-analog converter) is shown as DAC1 in the drawing. The first PWM circuit 53 is shown as PWM1 in the drawing. The analog-to-digital comparator 54 (analog-to-digital converter) is shown as ADC in the drawing. The second PWM circuit 55 is shown as PWM2 in the drawing. The second digital-to-analog comparator 56 (second digital-to-analog converter) is shown as DAC2 in the drawing.

The CPU 51 is a central processing device in the microcomputer 50 and controls the first digital-to-analog comparator 52, the first PWM circuit 53, the analog-to-digital comparator 54, the second PWM circuit 55, and the second digital-to-analog comparator 56. In this embodiment, an expression "the CPU 51 controls the first digital-to-analog comparator 52 and causes the first digital-to-analog comparator 52 to execute processing" will be replaced with an expression "the first digital-to-analog comparator 52 executes processing" for the convenience of description.

The first digital-to-analog comparator 52 (DAC1) designates the current value output from the current-output-controlled-switching power source 10 by outputting an analog signal that designates the driving current (LD current) value of the LD (light-emitting element 7).

Here, the current value designation signal Ictrl is changed by the analog switch 4 in accordance with the turning-on designation signal LDEN.

When the pulse is turned on, that is, the turning-on designation signal LDEN is in H level, the current value designation signal Ictrl has a value in the DAC1. The value in the DAC1 is an analog value output by the first digital-to-analog comparator 52.

On the other hand, when the pulse is turned off, that is, the turning-on designation signal LDEN is in L level, the current value designation signal Ictrl has a value of a GND level. At this time, the current value output from the current-output-controlled-switching power source 10 is zero.

In other words, the first digital-to-analog comparator 52 outputs an analog signal so as to set the current value designation signal Ictrl corresponding to the value of the current that flows in the light-emitting element 7 when the current is in an ON state.

Here, the analog switch 4 causes the current value designation signal Ictrl to coordinate with the turning-on designation signal LDEN.

The first PWM circuit 53 (PWM1) generates a timing of the pulse. The first PWM circuit 53 outputs the turning-on designation signal LDEN, thus instructing the FET switch 2 to turn on and off the LD current.

In other words, the first PWM circuit 53 outputs a first PWM signal corresponding to the turning-on designation signal LDEN to the FET switch 2 and turns on and off the current that flows in the light-emitting element 7.

Here, when the first PWM circuit 53 turns on the turning-on designation signal LDEN so as to turn on the light-emitting element 7, the analog switch 4 turns on the current value designation signal Ictrl at the same time as the turning-on designation signal LDEN is turned on. The current value designation signal Ictrl corresponds to the value of the current that is controlled in accordance with the analog signal output by the first digital-to-analog comparator 52 and flows in the light-emitting element 7 when the current is in the ON state.

In addition, when the first PWM circuit 53 turns off the turning-on designation signal LDEN so as to turn off the light-emitting element 7, the analog switch 4 turns off the current value designation signal Ictrl at the same time as the turning-on designation signal LDEN is turned off.

The analog-to-digital comparator 54 (ADC) measures the voltage (VOUT) output from the current-output-controlled-switching power source 10.

In other words, the analog-to-digital comparator 54 measures the output voltage VOUT of the current-output-controlled-switching power source 10 (switching power source).

The second PWM circuit 55 (PWM2) generates a pulse, which has the same cycle as that of the turning-on designation signal LDEN output by the first PWM circuit 53 (PWM1) and is in synchronization with the turning-on designation signal LDEN, at a timing before the first PWM circuit 53 outputs the turning-on designation signal LDEN, thus generating an amplifier-output signal AMPEN used for turning on and off a signal output from the operational amplifier 3.

In other words, the second PWM circuit 55 outputs a second PWM signal to the digital switch 5 as the amplifier-output signal AMPEN. The second PWM signal has the same cycle as that of the first PWM signal and is synchronized with the first PWM signal.

Here, the digital switch 5 connects the output terminal of the operational amplifier 3 to the output terminal of the current-output-controlled-switching power source 10 (switching power source) when the amplifier-output signal AMPEN input into the digital switch 5 is in, for example, H (high) level.

In addition, the operational amplifier 3 (voltage source) compares the voltage of a positive input terminal thereof with the voltage of a negative input terminal thereof, and outputs or inputs a current such that both the voltages are the same. When the operational amplifier 3 outputs the current, the operational amplifier 3 is called a current source. When the operational amplifier 3 inputs the current, the operational amplifier 3 is called a current sink, or is customarily called a sink. Only when the amplifier-output signal AMPEN is at the high level is the operational amplifier 3 connected to the output terminal of the current-output-controlled-switching power source 10 (switching power source).

In other words, the operational amplifier 3 compares a reference voltage input into the positive input terminal with the voltage input from the output terminal of the current-output-controlled-switching power source 10 (switching power source) into the negative input terminal, and outputs a current such that both the voltages are the same.

Here, a storage unit 57 (storage medium) built in the CPU 51 stores the output voltage VOUT of the current-output-controlled-switching power source 10 measured by the analog-to-digital comparator 54 (ADC) as the reference voltage.

In addition, the second digital-to-analog comparator 56 (DAC2) outputs an adjustment target voltage, which is the reference voltage stored on the storage unit 57, of the output voltage VOUT to the positive input terminal of the operational amplifier 3.

In other words, the second digital-to-analog comparator 56 (DAC2) outputs the reference voltage stored on the storage unit 57 to the positive input terminal of the operational amplifier 3 (voltage source).

A driving device including the microcomputer 50 (processor), the analog switch 4, the operational amplifier 3 (voltage source), and the digital switch 5 operates as follows at a pulse-light-emitting timing shown in FIG. 2. The pulse-light-emission timing indicates a timing in a light-emitting device that regularly or irregularly repeats a turning-on operation and a turning-off operation.

Figure 2:
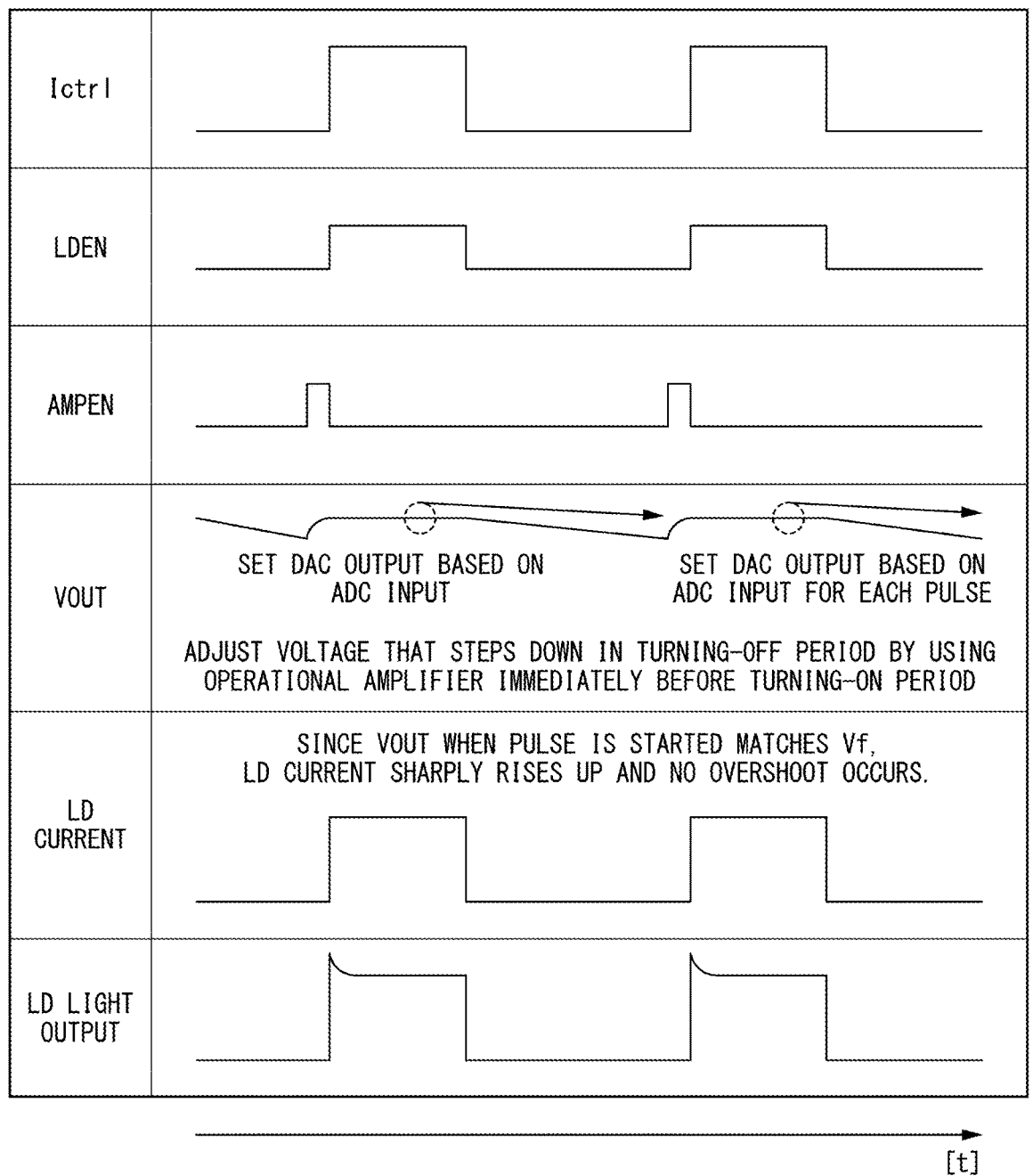
FIG. 2 is a liming chart showing an operation of the light-emitting device shown in FIG. 1.

FIG. 2 is a timing chart showing an operation of the light-emitting device 100 shown in FIG. 1. FIG. 2 shows a temporal change in each of the current value designation signal Ictrl, the turning-on designation signal LDEN, the amplifier-output signal AMPEN, the value [V] of the output voltage VOUT, the value [A] of the LD current, and the amount [W] of light output from the LD in the light-emitting device 100 shown in FIG. 1.

Here, pulse-light-emission indicates that the light-emitting device 100 regularly or irregularly repeats an operation of turning on the pulse and an operation of turning off the pulse. The pulse is turned on in a turning-on period during which the light-emitting element 7 is turned on. The pulse is turned off in a turning-off period during which the light-emitting element 7 is turned off.

When the turning-on designation signal LDEN is in H level, the pulse is turned on. At this time, the LD current flows in the light-emitting element 7 (LD) in accordance with the output voltage VOUT of the current-output-controlled-switching power source 10 (switching power source) on the basis of the value designated by the current value designation signal Ictrl. The current-output-controlled-switching power source 10 outputs a constant current in a period during which the pulse is turned on while determining the value of the current.

In addition, when the pulse is turned off, the current value designation signal Ictrl is at zero (GND level). Therefore, the current-output-controlled-switching power source 10 stops the output thereof.

There is a case in which the output voltage VOUT decreases due to an unintentional leaking current or self-discharge of a condenser when the pulse is turned off. Even in such a case, the output voltage VOUT of the output condenser 6 (condenser) is adjusted through the operational amplifier 3 in a period during which the amplifier-output signal AMPEN is in H level prior to a pulse-turning-on period during which the pulse is turned on. Accordingly, it is possible to cause a constant current having an appropriate voltage to flow in the light-emitting element 7 (LD) as the LD current from the beginning of the pulse-turning-on period.

Here, the appropriate voltage indicates the output voltage VOUT of the current-output-controlled-switching power source 10 in a previous pulse-turning-on period. The appropriate voltage is shown as the value of the output voltage VOUT surrounded by a round dotted line in FIG. 2.

The analog-to-digital comparator 54 (ADC) measures the output voltage VOUT, saves the value (reference voltage) of the output voltage VOUT on the storage unit 57, and sets the saved value as a value of the reference voltage output from the second digital-to-analog comparator 56 (DAC2) to the positive input terminal of the operational amplifier 3.

In this way, the operational amplifier 3 (voltage source) charges or discharges the output condenser 6 (condenser). The voltage across the output condenser 6 is a voltage (output voltage VOUT) corresponding to the constant current (LD current) at the timing at which generation of a subsequent pulse is started.

After the sequential processing described above, the LD current has a waveform of an ideal square wave, and the light output from the LD also has a preferable waveform.

In the first embodiment, the output voltage VOUT, which steps down in a turning-off period, is adjusted by using the operational amplifier 3 (voltage source) immediately before a turning-on period.

There is a problem with the technique disclosed in Japanese Patent No. 5660936 as follows. There is a case in which the cycle of the pulse-light-emission, that is, a period during which a pulse is repeatedly turned on and off, is not fixed. In other words, there is a case in which turning-on and turning-off of a light-emitting device are irregularly repeated. In such a case, the output voltage at the timing at which the pulse is started is affected by the length of the turning-off period. In a case in which the interval between pulses is long, a period of time during which leaking or self-discharge occurs is long and the voltage of an output condenser is low, compared to a case in which the interval is shorter. However, the problem described above is resolved in the first embodiment of the present invention.

In addition, as shown in FIG. 2, since the output voltage VOUT at the timing at which the pulse is started matches Vf in a waveform of the LD current, the LD current sharply rises up. Furthermore, no overshoot occurs in the waveform of the LD current.

There is a problem with the technique disclosed in Japanese Unexamined Patent Application, First Publication No. 2005-063997 as follows. A light-emitting device is turned on by using a pulse, and a voltage source is switched to a current source while the pulse is turned on. Therefore, at the time of the switching, a voltage difference occurs between the voltage output by the voltage source and the voltage (Vf), generated by the current source, across the light-emitting device (LD). Furthermore, the output of the voltage source and the output of the current source are switched by different switches (SW2 and SW11-1). Even if both the switches operate at the same time, or even if one switch operates earlier than the other switch, it is impossible to avoid a sharp change in the LD-driving current while the pulse is turned on. Accordingly, the amount of light sharply changes while the pulse is turned on. However, the problem described above is resolved in the first embodiment of the present invention.

According to the first embodiment, the output condenser 6 (smoothing condenser) is connected to the output terminal 5 of the current-output-controlled-switching power source 10, which is a switching power source of a current-output-controlled type. When the pulse is turned off, the current value designation signal Ictrl output to the current-output-controlled-switching power source 10 and the turning-on designation signal LDEN output to the FET switch 2 (switch), which turns on and off the LD current output to the LD, are turned off at the same time. By doing this, the voltage in a period during which the LD is driven by a predetermined current remains in the smoothing condenser.

In the above-described situation, there is a case in which leaking or discharge occurs in the smoothing condenser or components around the smoothing condenser before the pulse is next turned on. Therefore, there is a case in which the output voltage VOUT is lower than an appropriate voltage for driving the LD in a period during which the pulse is turned off. The operational amplifier 3 (voltage source) adjusts the voltage across the smoothing condenser to be a necessary voltage for a next pulse. Therefore, it is possible to reliably adjust the voltage across the smoothing condenser even when the cycle of the pulse-light-emission is not fixed. In this way, the LD current has a waveform of an ideal square wave, and the light output from the LD also has a preferable waveform.

Second Embodiment

Figure 3:
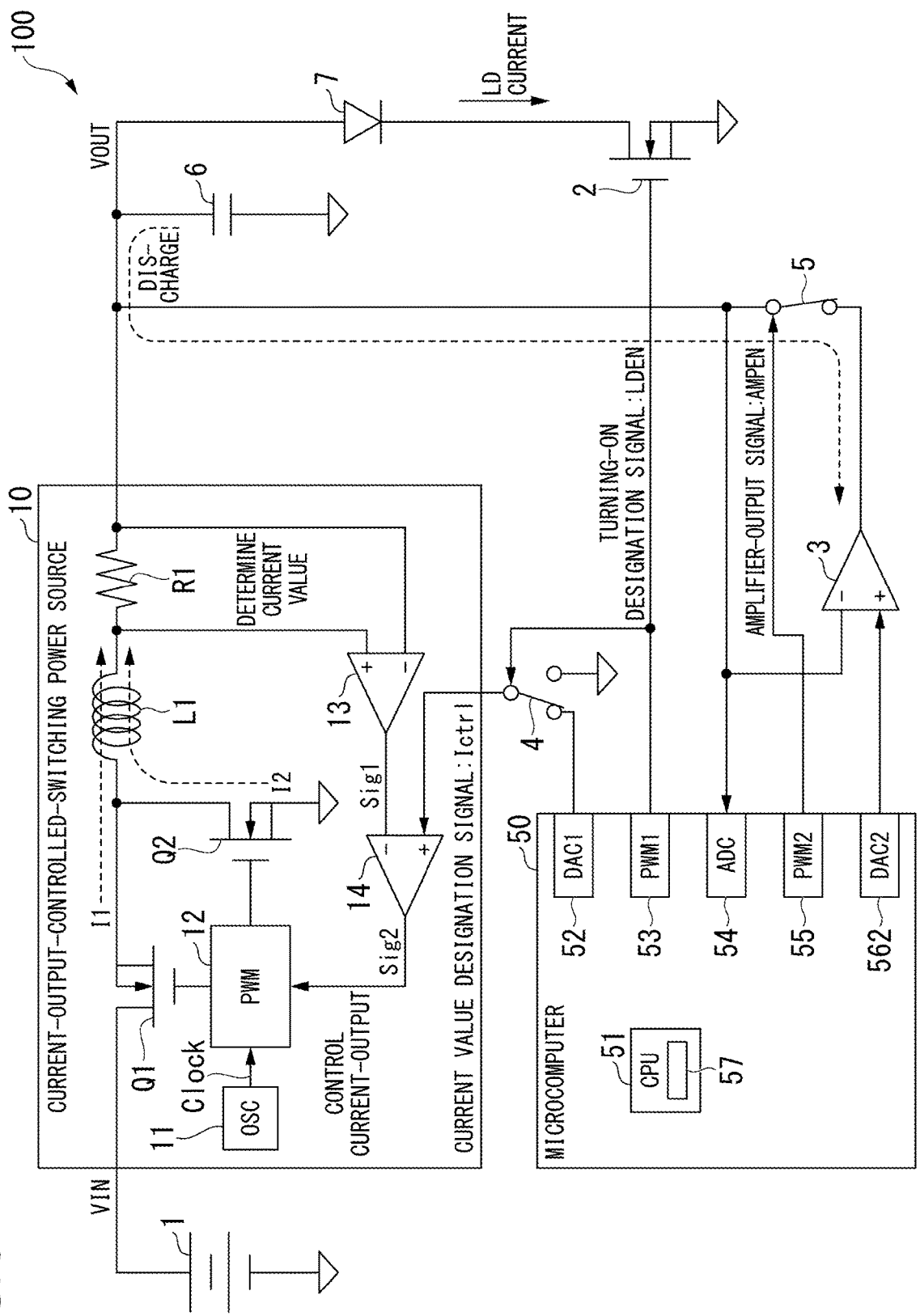
FIG. 3 is a block diagram showing an example of a configuration of a light-emitting device according to a second embodiment of the present invention.
Figure 4:
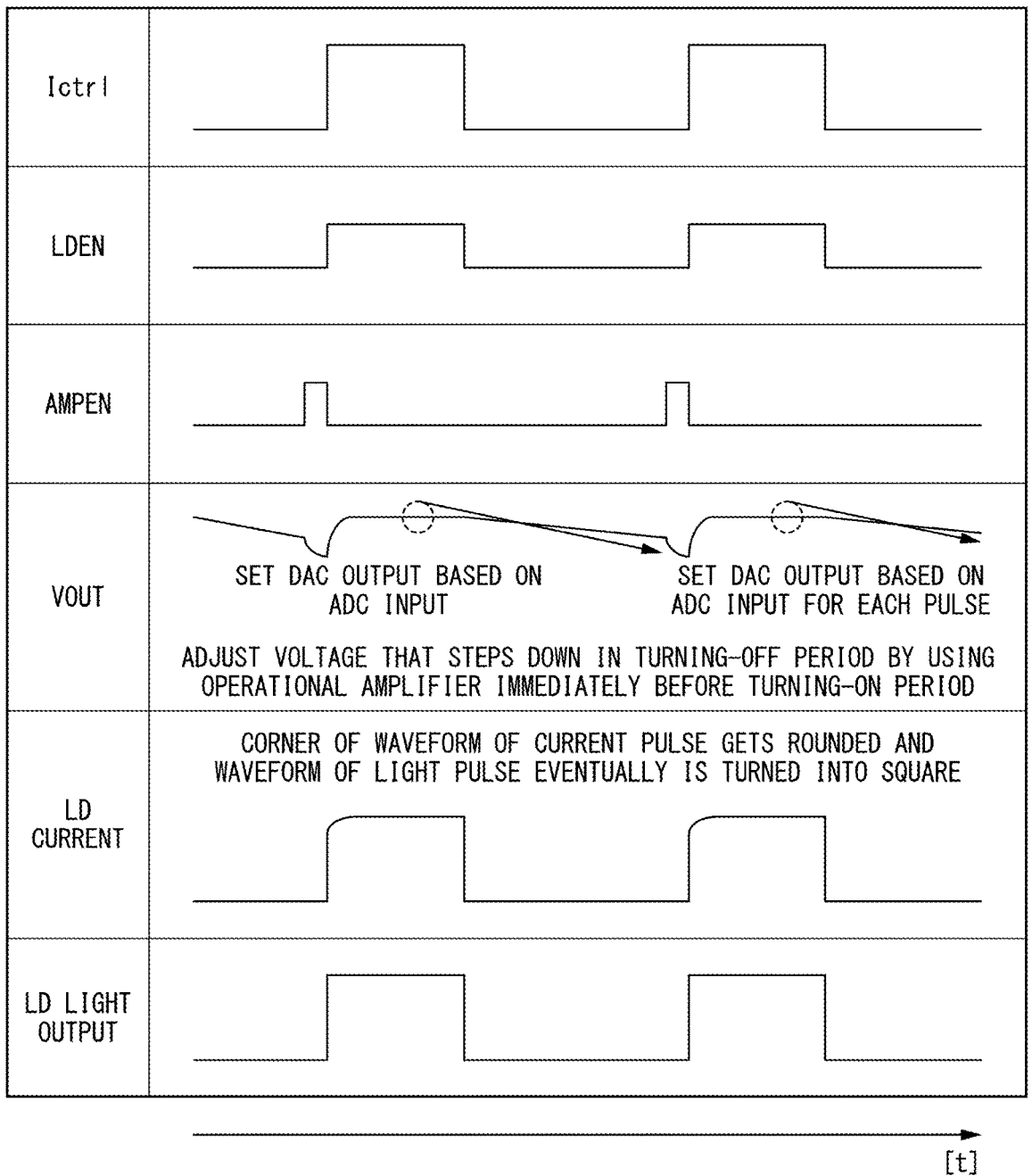
FIG. 4 is a timing chart showing an operation of the light-emitting device shown in FIG. 3.

A second embodiment of the present invention will be described by comparing the second embodiment with the first embodiment. FIG. 3 and FIG. 4 correspond to FIG. 1 and FIG. 2 used in the first embodiment, respectively.

FIG. 3 is a block diagram showing an example of a configuration of a light-emitting device according to the second embodiment of the present invention. In addition, FIG. 4 is a timing chart showing an operation of the light-emitting device 100 shown in FIG. 3.

In the first embodiment, the LD current has a waveform of an ideal square wave. However, as disclosed in Japanese Unexamined Patent Application, First Publication No. S62-118590, the light-emitting element 7 (LD) has temperature characteristics indicating that the intensity of light output by the light-emitting element 7 gets higher as temperature decreases. Accordingly, in a case in which the LD current has a waveform of an ideal square wave, overshoot occurs in a pulse of light as shown in FIG. 2.

Thus, the following processing is executed on the reference voltage supplied in the first embodiment.

In the first embodiment, the value measured by the ADC is set as a value of the reference voltage output from the second digital-to-analog comparator 56 (DAC2) to the positive input terminal of the operational amplifier 3.

In other words, the analog-to-digital comparator 54 (ADC) measures the output voltage VOUT of the current-output-controlled-switching power source 10 in the previous pulse-turning-on period. The output voltage VOUT is surrounded by a round dotted line in FIG. 2. The analog-to-digital comparator 54 saves the value (reference voltage value) of the output voltage VOUT on the storage unit 57 and sets the saved value as a value of the reference voltage output from the second digital-to-analog comparator 56 (DAC2) to the positive input terminal of the operational amplifier 3.

In this way, the operational amplifier 3 (voltage source) charges or discharges the output condenser 6 (condenser). The voltage across the output condenser 6 is a voltage (output voltage VOUT) corresponding to the constant current (LD current) at the timing at which generation of a subsequent pulse is started.

In the second embodiment, the analog-to-digital comparator 54 (ADC) measures the output voltage VOUT of the current-output-controlled-switching power source 10 in the previous pulse-turning-on period as in the first embodiment. The output voltage VOUT is surrounded by a round dotted line in FIG. 4. The analog-to-digital comparator 54 saves the value (reference voltage value) of the output voltage VOUT on the storage unit 57 and sets a voltage, which is lower than that having the reference voltage value, output from a second digital-to-analog comparator 562 (DAC2) to the positive input terminal of the operational amplifier 3. Hereinafter, the voltage lower than that having the reference voltage value is called a lower-reference-voltage.

In this way, the operational amplifier 3 (voltage source) outputs the lower-reference-voltage and sets the output voltage VOUT to the lower-reference-voltage at the timing at which generation of a subsequent pulse is started.

In this way, the output voltage VOUT at the timing at which generation of a pulse is started decreases and the LD current gradually rises up at the beginning of the generation of the pulse. Accordingly, it is possible to suppress overshoot of light output from the LD as shown in FIG. 4.

It is preferable that the lower-reference-voltage be set in accordance with the length of the turning-off period.

For example, when the length of the turning-off period is tmax, which is the longest of the lengths of configurable periods, the amount of discharge in the output condenser 6 is the greatest and the output voltage VOUT has the smallest value VOUTmin. On the other hand, when the length of the turning-off period is tmin, which is the shortest of the lengths of the configurable periods, the amount of discharge in the output condenser 6 is the smallest and the output voltage VOUT has a value VOUTmax smaller than the reference voltage value.

Therefore, the light-emitting device 100 determines the lower-reference-voltage during a period of which the length is between tmin and tmax and confirms that the overshoot of light output from the LD is suppressed when the determined lower-reference-voltage is used. The light-emitting device 100 sets the output voltage VOUT to the lower-reference-voltage corresponding to the length of the turning-off period during which the overshoot is suppressed.

Instead of setting the lower-reference-voltage in accordance with the length of the turning-off period, the light-emitting device 100 may set the lower-reference-voltage in accordance with the length of a period during which the amplifier-output signal AMPEN is in H level.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving device configured to drive a light-emitting device configured to regularly or irregularly repeat a turning-on operation and a turning-off operation, the driving device comprising:

a processor;
an analog switch;
a voltage source; and
a digital switch,
wherein the light-emitting device comprises:
- a light-emitting element driven by using a pulse;
- the processor;
- a switching power source of a current-output-controlled type configured to control current-output thereof on the basis of a current value designation signal output from the processor;
- a condenser configured to smooth an output voltage of the switching power source;
- a switch configured to turn on and off a current input into the light-emitting element on the basis of a turning-on designation signal output from the processor; and
- the voltage source configured to adjust a voltage of the condenser, wherein the processor comprises:
- a first digital-to-analog comparator configured to output an analog signal so as to set the current value designation signal corresponding to a value of a current that flows in the light-emitting element when the current is in an ON state;
- a first PWM circuit configured to output a first PWM signal corresponding to the turning-on designation signal to the switch and turn on and off the current that flows in the light-emitting element;
- an analog-to-digital comparator configured to measure the output voltage;
- a storage medium configured to store thereon the measured output voltage as a reference voltage;
- a second PWM circuit configured to output, as an amplifier-output signal to the digital switch, a second PWM signal that has the same cycle as that of the first PWM signal and is in synchronization with the first PWM signal; and
- a second digital-to-analog comparator configured to output the reference voltage stored on the storage medium to the voltage source, wherein the analog switch is configured to cause the current value designation signal to coordinate with the turning-on designation signal, wherein the voltage source is an operational amplifier configured to compare the reference voltage input into a positive input terminal thereof with the output voltage input into a negative input terminal thereof and output a current such that the reference voltage and the output voltage are the same, wherein the digital switch is configured to connect an output terminal of the operational amplifier to an output terminal of the switching power source when the amplifier-output signal input into the digital switch is at a high level, wherein the first PWM circuit is configured to turn on the turning-on designation signal, wherein the analog switch is configured to turn on the current value designation signal at the same time as the turning-on designation signal is turned on so as to turn on the light-emitting element, the current value designation signal corresponding to a value of the current that is controlled in accordance with the analog signal and flows in the light-emitting element when the current is in the ON state, wherein the analog-to-digital comparator is configured to measure the output voltage in a turning-on period of the light-emitting element and store the measured output voltage on the storage medium as a reference voltage, wherein the first PWM circuit is configured to turn off the turning-on designation signal, wherein the analog switch is configured to turn off the current value designation signal at the same time as the turning-on designation signal is turned off so as to turn off the light-emitting element, and wherein the voltage source is configured to compare the reference voltage input into the positive input terminal with the output voltage input into the negative input terminal and output a current to the condenser so as to adjust the voltage of the condenser such that the reference voltage and the output voltage are the same in a period during which the second PWM circuit turns on the digital switch by outputting the amplifier-output signal at the high level immediately before the light-emitting element is next turned on.

* * * * *